United States Patent [19]

Kawasaki et al.

[11] 4,084,166
[45] Apr. 11, 1978

[54] CIRCUIT FOR LOCKING LED LIGHT METER DISPLAY IN RESPONSE TO METER DISPLAY IN RESPONSE TO MIRROR MOVEMENT IN SLR CAMERA

[75] Inventors: Masahiro Kawasaki, Tokyo; Eiichi Tano, Asaka; Yoshio Sawada, Tokyo, all of Japan

[73] Assignee: Asahi Kogaku Kogyo Kabushiki Kaisha, Tokyo, Japan

[21] Appl. No.: 735,660

[22] Filed: Oct. 26, 1976

[30] Foreign Application Priority Data

Oct. 27, 1975   Japan ................................ 50-129122

[51] Int. Cl.² .......................... G03B 7/08; G03B 17/20
[52] U.S. Cl. .................................. 354/23 D; 354/53; 354/60 L; 354/289
[58] Field of Search ..................... 354/23 D, 53, 60 L, 354/289, 50, 51

[56] References Cited

U.S. PATENT DOCUMENTS

| | | | |
|---|---|---|---|
| 3,879,118 | 4/1975 | Kiyohara | 354/23 D |
| 3,921,183 | 11/1975 | Toyoda | 354/23 D |
| 3,921,187 | 11/1975 | Kobori et al. | 354/50 |

*Primary Examiner*—Russell E. Adams
*Attorney, Agent, or Firm*—Sughrue, Rothwell, Mion, Zinn and Macpeak

[57] ABSTRACT

An SLR camera includes a light measuring and computing circuit 1-7 whose output is fed to a comparator 8 together with the analog output of a D/A converter 12 coupled to a bidirectional counter 13. The counter is servo-loop driven to achieve circuit balance through AND gates 10, 11 in response to the comparator outputs, and the decoded counter outputs energize an appropriate LED display element L1-L16. The AND gates are disabled by the closing of switch 17 in response to the raising of the reflex mirror, to thereby lock the counter and display and prevent fluctuations therein. A capacitive time delay may be provided after the reopening of the switch following the lowering of the mirror to allow circuit transients to settle out.

4 Claims, 4 Drawing Figures

CIRCUIT FOR LOCKING LED LIGHT METER DISPLAY IN RESPONSE TO METER DISPLAY IN RESPONSE TO MIRROR MOVEMENT IN SLR CAMERA

BACKGROUND OF THE INVENTION

This invention relates to a circuit for locking or freezing the LED display indicators in the light finder of a single lens reflex camera during the movement of the reflex mirror.

Single lens reflex cameras using LED light finder indicators are commercially available. Such cameras involve a drawback, however, in that the quantity of light incident on the light sensing element varies as the reflex mirror is moved between its upper and lower positions, thus causing fluctuations of the energized LEDs with attendant reading difficulty and unstable operation.

SUMMARY OF THE INVENTION

The present invention avoids the aforesaid drawbacks by providing, in a single lens reflex camera, circuit means for locking or freezing the LED display at the beginning of the upward movement of the reflex mirror. The display is unlocked after a short time delay following the return of the mirror to its lower position.

Briefly, and inaccordance with the invention, an SLR camera includes a light measuring and computing circuit whose output is fed to a comparator together with the analog output of a D/A converter coupled to a bidirectional counter. The counter is servo-loop driven to achieve circuit balance through AND gates in response to the comparator outputs, and the decoded counter outputs energize an appropriate LED display element. The AND gates are disabled by the closing of a switch in response to the raising of the reflex mirror, to thereby lock the counter and display and prevent fluctuations therein. A capacitive time delay may be provided after the reopening of the switch following the lowering of the mirror to allow circuit transients to settle out.

DETAILED DESCRIPTION OF THE PREFERRED EMBODIMENT

Figure 1:
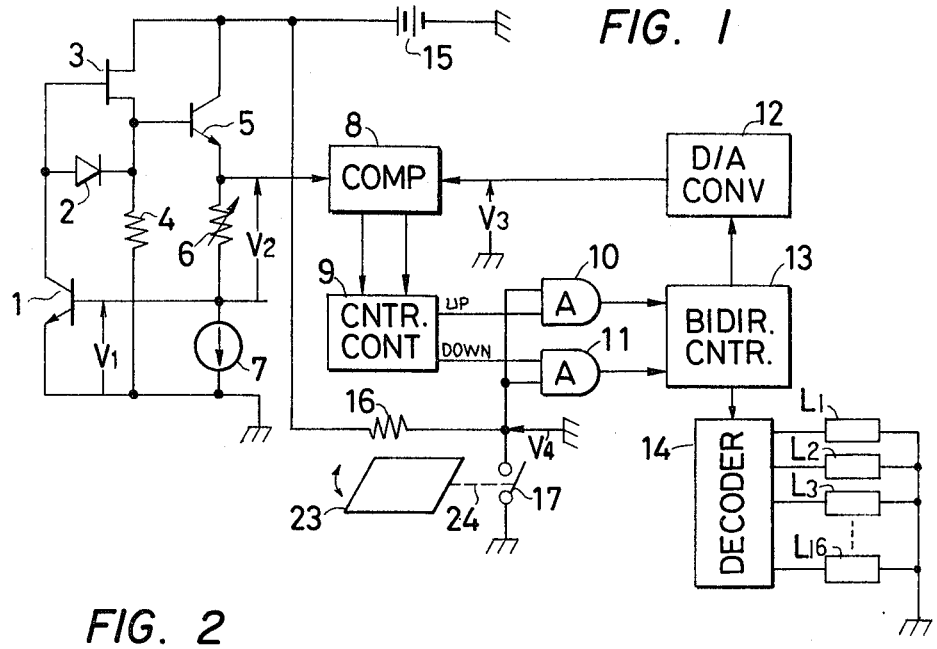
FIG. 1 shows a schematic and block diagram of a light meter and digital output display embodying the present invention.

FIG. 1 shows a logarithmically compressing transistor 1 whose collector is connected to the gate of a FET 3 which constitutes a self-biasing circuit in combination with a photo-diode 2 and a resistor 4. The source of FET 3 is connected to the base of a transistor 5 whose emitter is driven by a constant current source 7. The emitter potential of transistor 5 is fed back to the base of transistor 1 through a variable resistor 6, whose resistance is adjusted or set to be proportional to the difference between the apex value $Sv$ of the film sensitivity and the apex value $Av$ of a desired aperture opening, i.e., $Sv-Av$.

Blocks 8, 9, 10, 11, 12, 13, and 14 constitute a follower-comparison type of A/D convertor. Reference numeral 8 designates an analog comparator circuit, 9 is a counter control circuit, 10 and 11 are AND circuits, 12 is a D/A convertor, 13 is a reversible counter, and 14 is a decoder circuit which controls LEDs L1, L2, L3, . . . . . L16 of the light meter display. A switch 17 is connected to a potential source 15 through a resistor 16, and is adapted to be transferred from its open position to its closed position at the commencement of the upward movement of the reflex mirror 23 by a simple mechanical transfer mechanism, shown schematically at 24. The switch 17 is connected to inputs of the AND circuits 10, 11.

In operation, feedback is effected from the collector of transistor 1, which is constant current driven by the photodiode 2, by way of the FET 3 and transistor 5 to the base of transistor 1, whereby a voltage V1 proportional to the apex value $Bv$ of the object brightness is produced across the base and emitter terminals of transistor 1. If the magnitude of the current regulated by the constant current source 7 is set so that the variation per step in the apex value $(Sv-Av)$ of the voltage $V_2$ across the variable resistor 6 is equal to the variation per step in the apex value of the sensed brightness level $Bv$, then the emitter potential $(V_1 + V_2)$ of transistor 5 will be proportional to the apex value $(Bv + Sv - Av)$, which corresponds to the apex value of the exposure time $Tv$.

The emitter potential of transistor 5 is fed to the input of the comparator circuit 8 for comparison with the output voltage $V_3$ of the D/A convertor 12. When $V_3 < (V_1 + V_2)$ a raised potential is fed from the counter control circuit 9 to the AND circuit 10. The other input voltage $V_4$ of the AND circuit 10 is high or raised when the switch 17 is open. Under these conditions the reversible counter 13 is incremented. Conversely, when $V_3 > (V_1 + V_2)$ the reversible counter 13 is decremented. When $V_3 = (V_1 + V_2)$ no output is produced by the comparator circuit, and the counter 13 remains fixed. At such time the value stored in the counter 13 is the digital equivalent of the apex exposure value $Tv$. The appropriate LED is then energized by the decoder 14, based on the digital input from the counter.

When the input signal $V_4$ to the AND circuits 10, 11 is low or zero, i.e., when the switch 17 is closed, the AND circuits are diabled and no outputs from the counter control circuit 9 are fed to the counter 13, whereby whatever value is stored in the counter is locked or maintained. In this manner, when the switch 17 is transferred to its closed position at the commencement of or just prior to the upward movement of the mirror, the LED indication is maintained in its then or present state. When the switch 17 is returned to its open position at the termination of or just after downward movement of the mirror, the AND circuits are again enabled and normal exposure meter operation is resumed.

Figure 2:
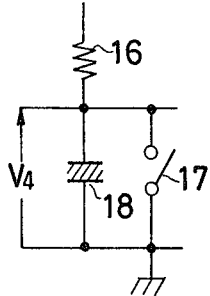
FIG. 2 shows a partial schematic diagram of a modification of the circuit of FIG. 1.
Figure 3:
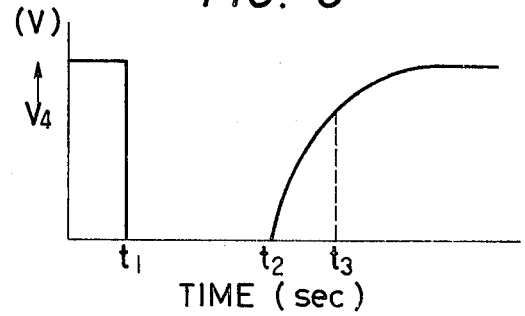
FIG. 3 shows a voltage-time plot for the circuit modification of FIG. 2.

In the circuit modification shown in FIG. 2, a condensor 18 is connected in parallel to the switch 17. In operation, referring to FIG. 3, when the switch 17 is in its open position the condensor 18 is charged to the voltage of the potential source 15. When the switch 17 is transferred to its closed position at time $t1$, due to the upward movement of the mirror, the condensor 17 is rapidly discharged through the switch 17. When the switch 17 is returned to its open position at time $t2$, due to the downward movement of the mirror, the condensor 18 is charged to the voltage of the potential source 15 through the resistor 16, which delays the time at which the AND circuits are enabled and normal operation resumes. In the absence of the condensor 18 the LED display indication is maintained from $t1$ to $t2$; with the addition of the condensor 18 the indication is maintained from $t1$ to $t3$. More particularly, the indication is maintained with the condensor 18 until the circuits arrive at a stable condition, after the descent of the mirror, whereby variations due to transient phenomena are prevented.

Figure 4:
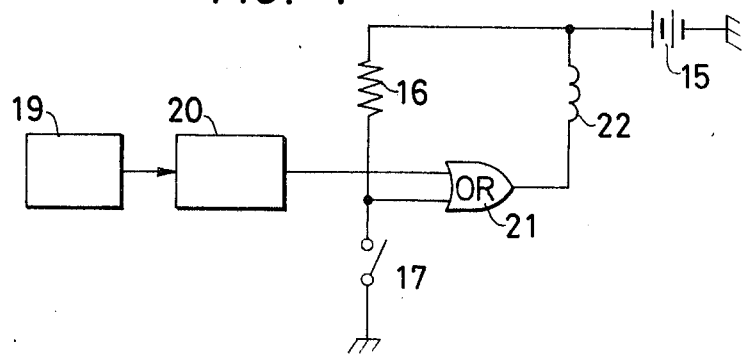
FIG. 4 shows a block diagram of a prior art automatic shutter control circuit incorporating the switching means of the present invention.

Referring now to FIG. 4, reference numeral 19 designates a light measuring and computing circuit as shown by reference numerals 1–7 in FIG. 1. Shown at 20 is an exposure time setting circuit, at 21 an OR circuit, and at 22 an exposure time setting magnet. In operation, when switch 17 is open an output of the OR circuit 21 is always high or raised, regardless of the output of the time setting circuit 20, whereby there is no potential across the magnet 22 and no current flows therethrough. In this manner current is conserved. When the switch 17 is closed, however, due to the upward movement of the mirror, the lower input to OR circuit 21 is grounded, or at logic 0, and the magnet 22 may be energized by the output of the exposure time setting circuit 20.

What is claimed is:

1. In a light meter for a single lens reflex camera including an array of LED display elements, A/D converter means for energizing individual ones of said elements in accordance with a sensed brightness level and predetermined parameters defining the film sensitivity and the lens aperture opening, and a reflex mirror movable between an upper position and a lower position, the improvement comprising:
   (a) switch means adapted to be closed at the commencement of the movement of the mirror from its lower position to its upper position, and
   (b) logic circuit means responsive to the closure of the switch means for disabling the further operation of the A/D converter means an locking the LED array in its then energized state,
   wherein the switch means is adapted to be opened at the termination of the movement of the mirror from its upper position to its lower position, and further comprising delay means responsive to the opening of the switch means for enabling the further operation of the A/D converter means and unlocking the LED array after a predetermined time interval.

2. A light meter as defined in claim 1, wherein the A/D converter means includes a bidirectional counter whose decoded outputs drive the LED array, the logic circuit means comprises a pair of AND gates individually connected to increment and decrement inputs of said counter, the switch means comprises a switch connected to ground at one terminal and connected through a resistor to the anode of a d.c. power supply at another terminal, said another terminal is connected to an input of each of said AND gates, and said delay means comprises a capacitor connected in parallel with said switch.

3. In an automatic shutter control circuit for a single lens reflex camera including a light measuring and computing circuit, an exposure time control circuit responsive to the output from the light measuring and computing circuit, an exposure time control magnet responsive to the output from the exposure time control circuit, and a reflex mirror movable between a lower position and an upper position, the improvement comprising:
   (a) switch means adapted to be closed at the commencement of the movement of the mirror from its lower position to its upper position, and
   (b) logic circuit means responsive the closure of the switch means for enabling the exposure time control magnet to be driven by the exposure time control circuit,
   and wherein said switch means is adapted to be opened at the termination of the movement of the mirror from its upper position to its lower position, and further comprising delay means responsive to the opening of said switch means for disabling after a predetermined time interval the driving control of said magnet by said exposure time control circuit.

4. An automatic shutter control circuit as defined in claim 3, wherein the logic circuit means comprises as OR gate connected between the control circuit and the magnet, the switch means comprises a switch having one terminal connected to ground and another terminal connected to the anode of a d.c. power supply through a resistor, and wherein said another terminal is connected to an input of said OR gate.

* * * * *